United States Patent
Hirabayashi et al.

(10) Patent No.: US 6,205,006 B1
(45) Date of Patent: Mar. 20, 2001

(54) MAGNETIC RECORDING AND REPRODUCING APPARATUS WITH A ROTARY HEAD CYLINDER UNIT SUPPORTED WITH A PREDETERMINED PRESSURE

(75) Inventors: Koichiro Hirabayashi, Hirakata; Shigeo Ueda, Neyagawa; Eiji Nagasaki, Katano; Keishi Iwasaki, Mino, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/272,561

(22) Filed: Mar. 19, 1999

(30) Foreign Application Priority Data

Mar. 19, 1998 (JP) .................................................. 10-070175
Dec. 22, 1998 (JP) .................................................. 10-364520

(51) Int. Cl.[7] ........................................................ G11B 5/52
(52) U.S. Cl. .................................... 360/271.6; 360/271.8
(58) Field of Search ............................. 360/271.6, 271.8

(56) References Cited

U.S. PATENT DOCUMENTS

| 1,578,161 | 3/1926 | Monroe . | |
|---|---|---|---|
| 1,793,116 | 2/1931 | Monroe . | |
| 2,423,918 | 7/1947 | Wohlhieter . | |
| 3,943,569 | * 3/1976 | Bettini et al. | 360/109 |
| 5,021,908 | * 6/1991 | Morimoto et al. | 360/107 |
| 5,459,625 | 10/1995 | Ohshima et al. | 360/84 |
| 5,831,796 | * 11/1998 | Nishida | 360/107 |
| 5,883,751 | * 3/1999 | Choy | 360/107 |

FOREIGN PATENT DOCUMENTS 619160 10/1935 (DE) .
6-150473 * 5/1994 (JP) .

* cited by examiner

*Primary Examiner*—Brian E. Miller
(74) *Attorney, Agent, or Firm*—Wenderoth, Lind & Ponack, L.L.P.

(57) ABSTRACT

A magnetic recording and reproducing apparatus which allows a reduction in the necessary space by attaching a rotary head cylinder unit (5) onto a chassis 6 through leaf springs (23) using set screws (22). The rotary head cylinder unit (5) can be fixed onto the chassis (6) with a certain load without causing distortion of the rotary head cylinder unit. Integration of two or more leaf springs (131) improves efficiency in assembling the apparatus and reduces the number of components.

20 Claims, 11 Drawing Sheets

MAGNETIC RECORDING AND REPRODUCING APPARATUS WITH A ROTARY HEAD CYLINDER UNIT SUPPORTED WITH A PREDETERMINED PRESSURE

BACKGROUND OF THE INVENTION

1. Field of the Invention

The present invention relates to the field of magnetic recording and reproducing apparatuses such as video tape recorders which transport a magnetic tape around a rotary head cylinder unit, to which a magnetic head is attached, to bring the magnetic head and magnetic tape into contact for recording and reproducing signals.

2. Description of the Related Art

Magnetic recording and reproducing apparatuses such as videocassette tape recorders are becoming increasingly smaller and thinner.

A conventional magnetic recording and reproducing apparatus is described below.

FIG. 18 is a schematic top view of a conventional magnetic recording and reproducing apparatus in a position for recording signals onto a magnetic tape or playing back signals from a magnetic tape. A magnetic tape 2 is housed in a cassette 1, and is wound on reels 3 and 4 provided in the cassette 1. Signals are recorded on and reproduced from the magnetic tape 2 by slipping the magnetic tape 2 around a portion of a rotary head cylinder unit 5 (hereafter referred to as "cylinder unit") to which a magnetic head (not illustrated) is attached. The cylinder unit 5 is fixed onto a chassis 6. Tape guide posts 7, 8, 9, 10, 11, 12, 13, 14, and 15 are provided for leading the magnetic tape 2 out from the cassette 1 and guiding it to a predetermined position for recording and reproducing signals.

Next, how the cylinder unit 5 is fixed onto the chassis 6 is described. FIG. 19 is a sectional view of the cylinder unit 5 of the conventional magnetic recording and reproducing apparatus fixed onto the chassis 6. FIG. 20 is a plan view taken in the direction of Line D of FIG. 19. There are three set screws 190 which are engaging members for fixing the cylinder unit 5 to the chassis 6. There are three compression springs 191 corresponding to the set screws 190, respectively. The compression springs 191 are fixed at a constant load to avoid distortion of the cylinder unit 5. The cylinder unit 5 is attached to the chassis 6 by the set screws 190 through the compression springs 191.

With the above conventional configuration, however, a large height space is required for the set screws 190 and compression springs 191 in order to fix the cylinder unit 5 onto the chassis 6 at a constant load to prevent distortion. This presents a barrier to reducing the size of the magnetic recording and reproducing apparatus.

SUMMARY OF THE INVENTION

An object of the present invention is to provide a thin magnetic recording and reproducing apparatus without allowing distortion of the cylinder unit. In the present invention, the cylinder unit is fixed onto the chassis with a constant load, but requires only a small amount of space for attaching the cylinder unit onto the chassis.

A magnetic recording and reproducing apparatus of the present invention comprises a set screw having an external thread; a rotary head cylinder unit having an internal thread which screws onto the external thread of the set screw; a chassis on which the rotary head cylinder unit is mounted, with a hole to allow the passage of the set screw; and a leaf spring whose pressure on the chassis increases as the external thread of the set screw is screwed and tightened to the internal thread of the rotary head cylinder unit. This configuration allows the height of the set screw used for fixing the rotary head cylinder unit onto the chassis to be reduced, which permits the rotary head cylinder unit to be secured to the chassis with a constant load using a smaller space than that required in the prior art apparatuses. This allows the mechanism to be constructed so as to have a thinner profile.

DETAILED DESCRIPTION OF THE PREFERRED EMBODIMENTS

In the following embodiments, a cylinder unit 5 is screwed and engaged onto a chassis 6 at N engagement points. Accordingly there are N leaf spring(s) and N set screw(s), where N is a positive whole number. In the following description of each exemplary embodiment, N is three, which means there are three engagement points, three leaf springs, and three set screws. However, it is apparent that the number is not limited to three.

First Embodiment

Figure 1:
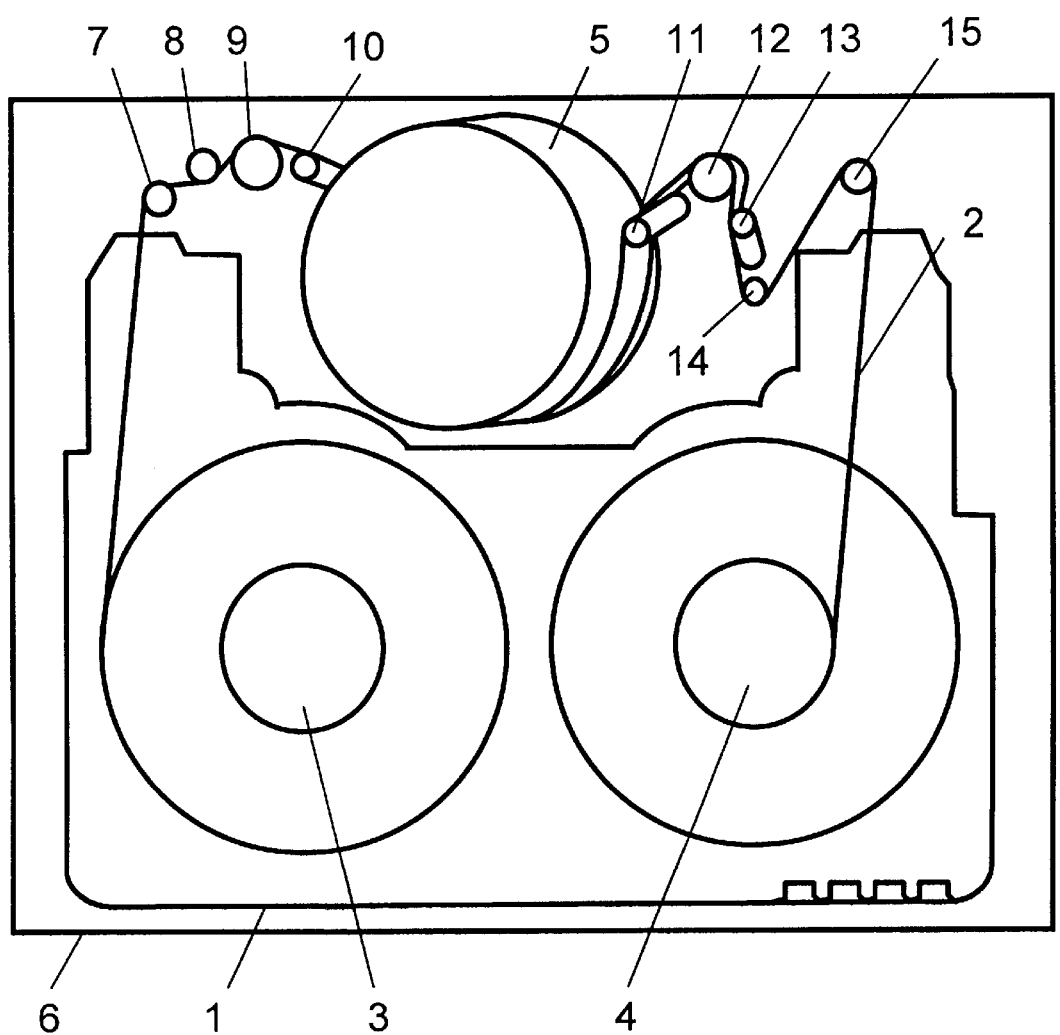
FIG. 1 is a schematic top plan view of a magnetic recording and reproducing apparatus in a position for recording and reproducing signals onto and from a magnetic tape in a first embodiment of the present invention.
Figure 2:
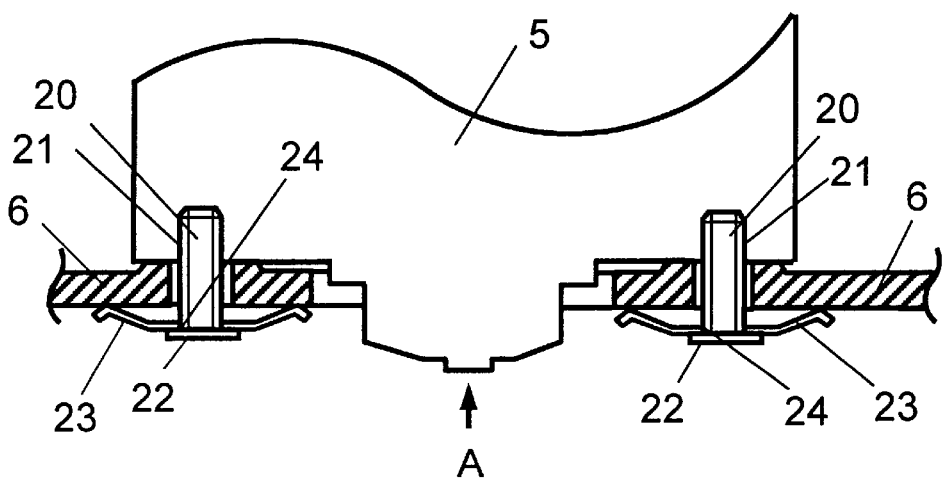
FIG. 2 is a sectional view taken in the direction of Line II of FIG. 3.
Figure 3:
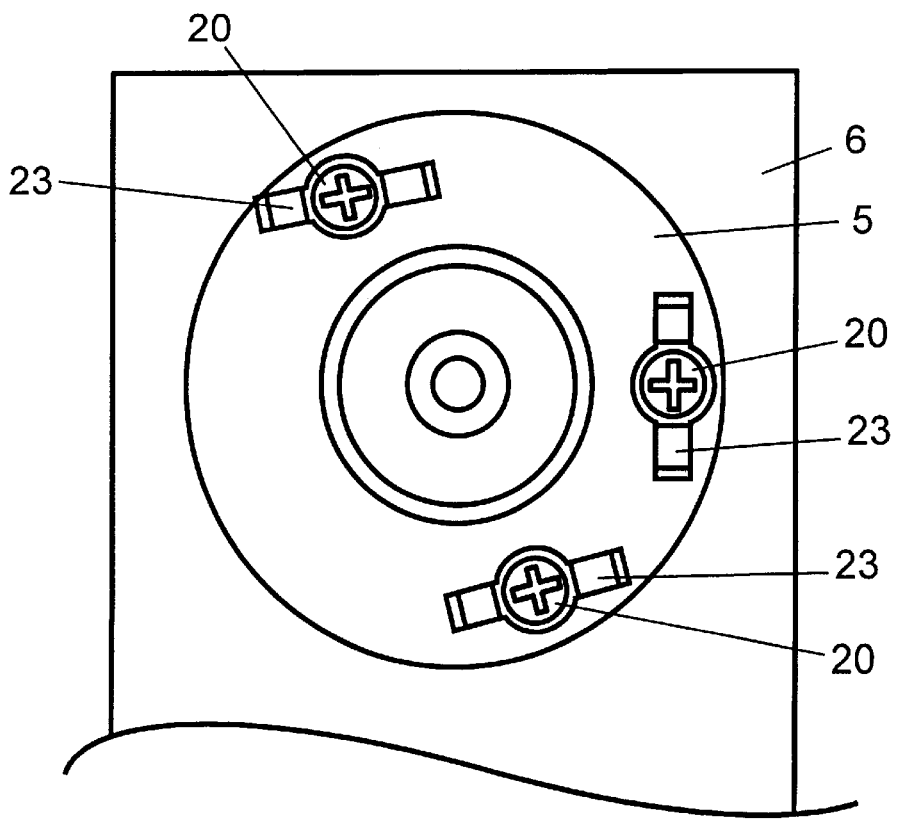
FIG. 3 is a plan view in the direction of arrow A of a cylinder unit fixed onto a chassis of the magnetic recording and reproducing apparatus in accordance with the first embodiment of the present invention.

A magnetic recording and reproducing apparatus according to a first embodiment of the present invention is described with reference to FIGS. 1 to 3. A magnetic tape 2 is wound on reels 3 and 4 which are housed in a cassette 1. Signals are recorded on and played back from the magnetic tape 2 by drawing out the magnetic tape 2 from the cassette 1 and locating it part way around a rotary head cylinder unit 5 to which a magnetic head (not illustrated) is attached.

The cylinder unit 5 comprises a rotary head cylinder to which the magnetic head is attached, and a stationary cylinder which is not rotatable. The stationary cylinder of the cylinder unit 5 is secured to a chassis 6. Hereafter, this is simply expressed as the chassis securing the cylinder unit 5. Tape guide posts 7, 8, 9, 10, 11, 12, 13, 14, and 15 are provided for leading out the magnetic tape 2 from the cassette 1, and guiding the magnetic tape 2 to a predetermined position for recording or reproducing signals.

Next, how the cylinder unit 5 is fixed onto the chassis 6 is described. In FIGS. 2 and 3, there are N numbers of set screws 20. Each set screw 20 comprises an external thread 21 and a unitary collar or retainer 22. The cylinder unit 5 is provided with N recesses which are internally threaded for receiving (not illustrated) the external threads 21 of the set screws 20, respectively. Here, N is a positive whole number of engagement points for screwing and engaging the cylinder unit 5 to the chassis 6. In the first embodiment, N is 3, which means there are three engagement points. Accordingly, there are N leaf springs 23 corresponding to the set screws 20. Each of the leaf springs 23 has a hole 24 through which the set screw 20 passes, and pressure applying ends provided on both sides of the hole 24 for pressing against the chassis 6. Each leaf spring 23 is disposed between the chassis 6 and the retainer 22 of the respective set screw 20. The chassis 6 is clamped between the cylinder unit 5 and the leaf spring 23. A constant distance between the cylinder unit 5 and the leaf spring 23 can be maintained by screwing the set screw 20 into the cylinder unit 2 in such a way that a tip of the external thread 21 of the set screw 20 contacts the bottom of the internal thread (not illustrated) formed on the cylinder unit 5. Consequently, the cylinder unit 5 is fixed with a constant load without causing distortion, and the cylinder unit 5 is attached to the chassis with the set screws 20 through the leaf springs 23.

As described above, the first embodiment enables the securing of the cylinder unit onto the chassis under a constant load without causing distortion of the cylinder unit. In addition, the use of the leaf springs allows reduction of the necessary height space, which enables the cylinder unit to be compactly attached to the chassis. This construction results in a thinner apparatus.

Second Embodiment

Figure 4:
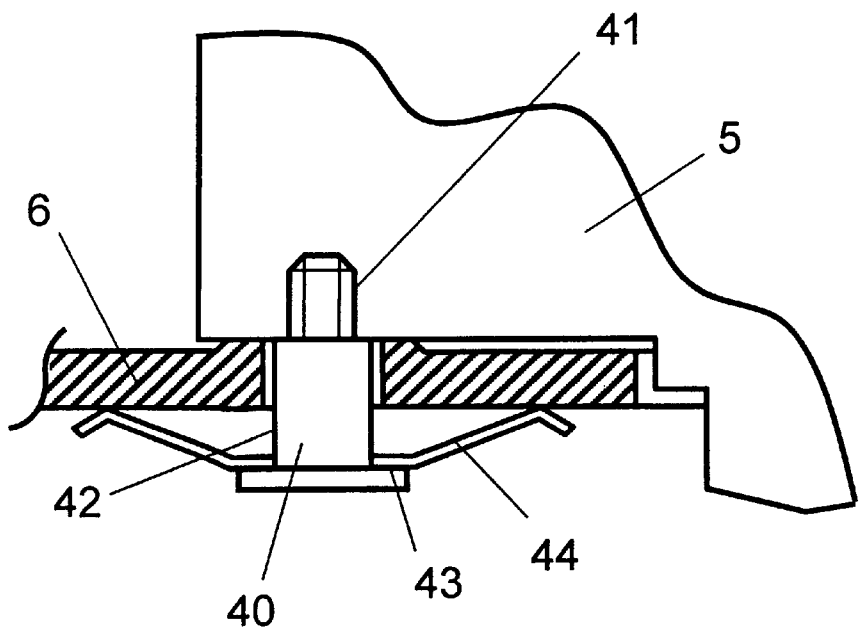
FIG. 4 is a sectional view illustrating a state in which the cylinder unit of the magnetic recording and reproducing apparatus is engaged with the chassis in accordance with a second embodiment of the present invention.

A magnetic recording and reproducing apparatus according to a second embodiment of the present invention is described with reference to FIGS. 4 and 5.

Figure 5:
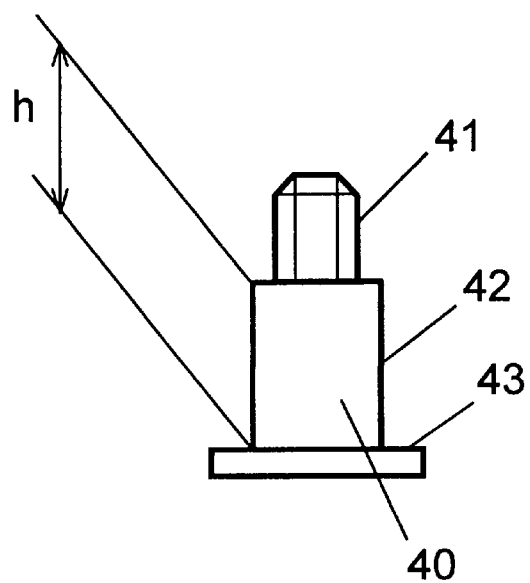
FIG. 5 shows the shape of a stepped screw used in the magnetic recording and reproducing apparatus shown in FIG. 4.

As shown in FIG. 5, a set screw 40 has a cylindrical part 42, which is concentric and formed integrally with a section provided with an external thread 41. An outer diameter of the cylindrical part 42 is larger than an outer diameter of the external thread 41. A retainer 43 is formed integrally with the cylindrical part 42, and an outer diameter of the retainer 43 is larger than the outer diameter of the cylindrical part 42. The distance between the cylinder unit 5 and a leaf spring 44 is kept constant by the height h of the cylindrical part 42.

How the cylinder unit 5 is fixed onto the chassis 6 is described with reference to FIG. 4. As in the first embodiment, the cylinder unit 5 is provided with recesses which are internally threaded so as to receive (not illustrated) the external threads 41 of the set screws 40. The chassis 6 and leaf spring 44 have a hole to allow the passage of the cylindrical part 42 of each of the set screws 40. The leaf spring 44 is disposed between the chassis 6 and the retainer 43 of the set screw 40. Accordingly, the distance between the cylinder unit 5 and the portion of the leaf spring 44 engaging the retainer 43 is maintained at approximately the height h of the cylindrical part 42 of the stepped set screw 40 by coupling and engaging the set screw 40 to the cylindrical unit 5 until an end face of the cylindrical part 42 contacts the bottom face of the cylinder unit 5. Opposite pressing ends of the leaf spring 44 press against the chassis 6. The cylinder unit 5 is in turn pressed and fixed to the chassis 6 by the approximately constant pressure of the leaf springs 44 via the set screws 40.

As described above, the second embodiment of the present invention allows attachment of the cylinder unit 5 onto the chassis 6 without distorting the cylinder unit 5, and thus achieves the same effects as in the first embodiment.

Third Embodiment

Figure 6:
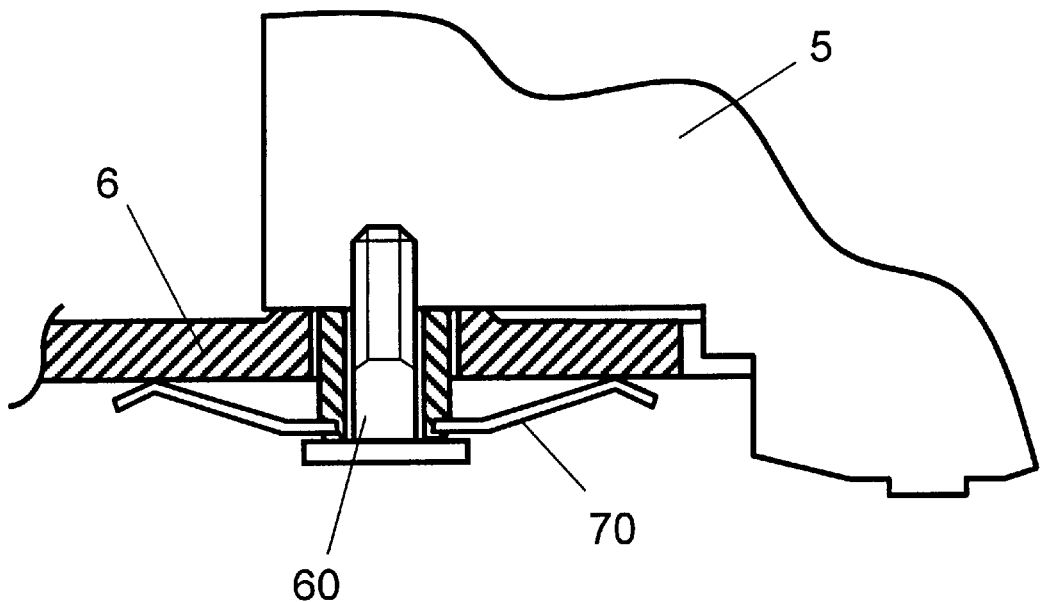
FIG. 6 is a sectional view of a cylinder unit of the magnetic recording and reproducing apparatus engaged with a chassis in accordance with a third embodiment of the present invention.
Figure 7:
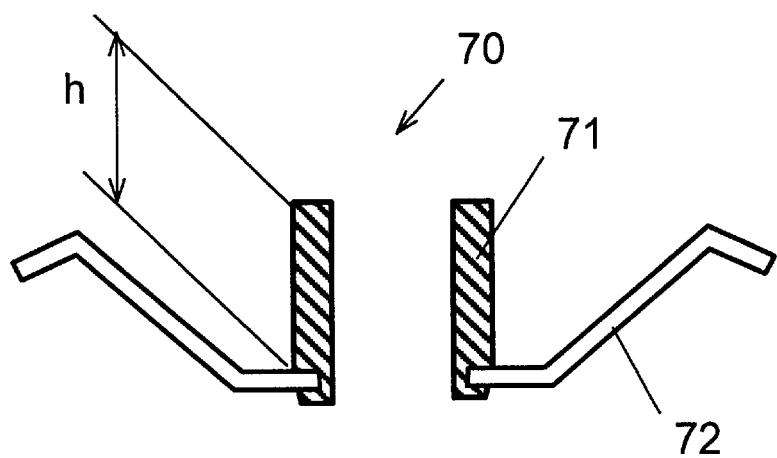
FIG. 7 shows a washer and leaf spring assembly used in the magnetic recording and reproducing apparatus shown in FIG. 6.

A magnetic recording and reproducing apparatus according to a third embodiment of the present invention is described with reference to FIGS. 6 and 7.

A washer and leaf spring assembly 70 is employed in the third embodiment. As shown in FIG. 7, the assembly 70 comprises a hollow cylindrical member 71 and leaf spring 72. A set screw 60 passes through a hole 73 formed in hollow cylindrical member 71. The leaf spring 72 is integrated with the hollow cylindrical member by means such as caulking or spot welding. The set screw 60 passes through the hollow part of the hollow cylindrical member 71 and engages with the cylinder unit 5. The height h of the cylinder of the hollow cylindrical member 71 functions to maintain a constant distance between the cylinder unit 5 and a portion of the leaf spring 72 engaging the hollow cylindrical member. Mounting the cylinder unit 5 on the chassis 6 in this manner permits the same effects as in the first embodiment to be realized.

In the third embodiment, the hollow cylindrical member 71 has an external cylindrical shape. It is apparent that it may also be a polygonal cylinder such as a four-sided or hexagonal prism. The same effects will be achieved as long as the hollow cylindrical member 71 has a columnar shape and a through hole for passing the set screw 60. Furthermore, the leaf spring 72 itself may be caulked so as to function as the hollow cylindrical member.

Fourth Embodiment

Figure 8:
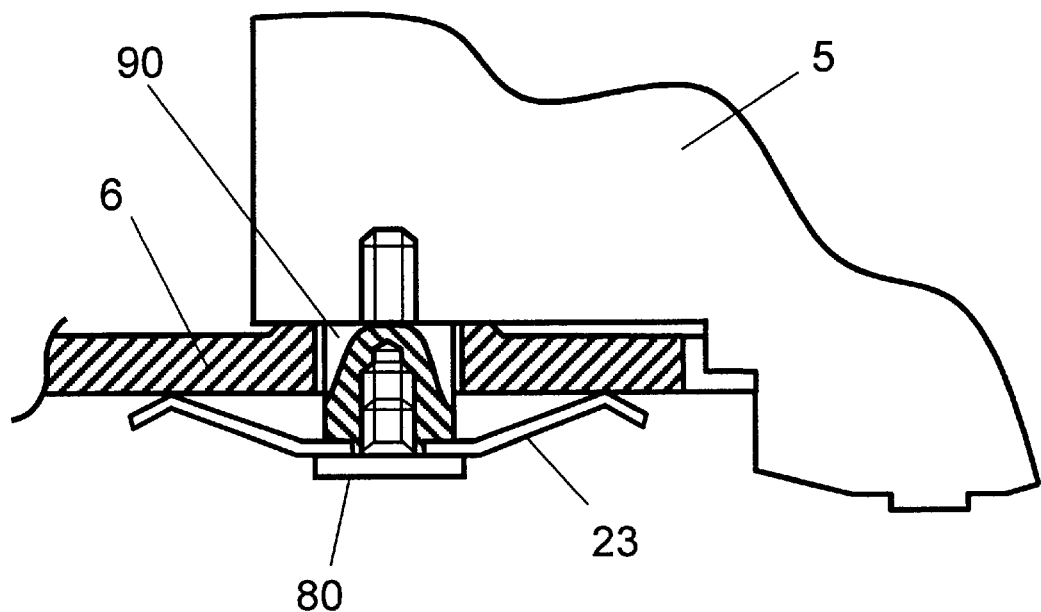
FIG. 8 is a sectional view of a cylinder unit of the magnetic recording and reproducing apparatus engaged with a chassis in accordance with a fourth embodiment of the present invention.
Figure 9:
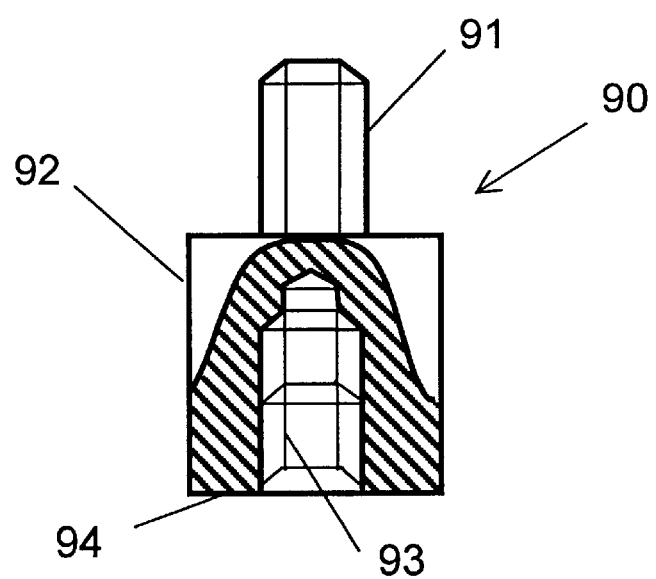
FIG. 9 shows a washer and screw assembly used in the magnetic recording and reproducing apparatus shown in FIG. 8.

A magnetic recording and reproducing apparatus according to a fourth embodiment of the present invention is described with reference to FIGS. 8 and 9.

In the fourth embodiment, a threaded post 90 has an externally threaded portion 91 on one end of cylindrical part 92. The outer diameter of the externally threaded portion 91 is smaller than the outer diameter of the cylindrical part 92. An internally threaded recess 93 is formed inside the cylindrical part 92. As shown in FIG. 8, the threaded post 90 is screwed into the cylinder unit 5. A leaf spring 23 contacts an end face 94 of the threaded post 90 at the side where the internal thread 93 is formed so that the chassis 6 is clamped between the cylinder unit 5 and the leaf spring 23. The leaf spring 23 is fixed in position with a set screw 80. With this arrangement, the same effects as in the first embodiment can be achieved.

The threaded post 90 in the fourth embodiment is cylindrical. However, it is apparent that any columnar shape such as a hexagonal or a rectangular prism is similarly applicable. The same effects can be achieved as long as the externally threaded portion 91 is provided on one end, and the internal thread 93 is provided on the other end.

Fifth Embodiment

A magnetic recording and reproducing apparatus according to a fifth embodiment is described with reference to FIGS. 10 and 11.

Figure 10:
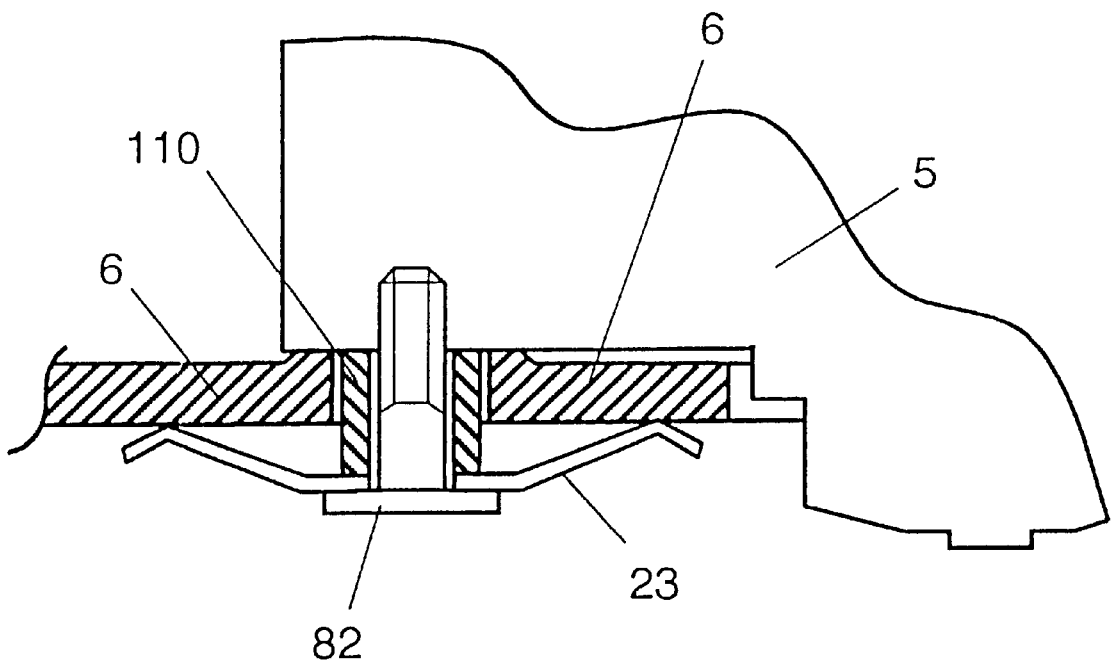
FIG. 10 is a sectional view of a cylinder unit of the magnetic recording and reproducing apparatus engaged with a chassis in accordance with a fifth embodiment of the present invention.
Figure 11:
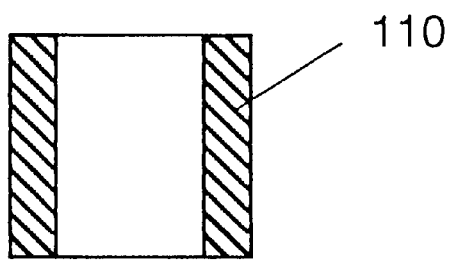
FIG. 11 shows a spacer used in the magnetic recording and reproducing apparatus shown in FIG. 10.

As shown in FIG. 11, one end of a hollow cylindrical spacer 110 contacts the cylinder unit 5 as shown in FIG. 10. The other end of the hollow cylindrical spacer 110 contacts the leaf spring 23. A set screw 100 passes through hollow cylindrical spacer 110 in order to attach the cylindrical unit 5 to the chassis 6. Accordingly, a constant distance is maintained between the cylinder unit 5 and the portion of the leaf spring 23 which contacts the hollow cylindrical spacer 110. Accordingly, the cylinder unit 5 can be attached to the chassis 6 without causing distortion of the cylindrical unit 5, as in the first embodiment.

Sixth Embodiment

Figure 12:
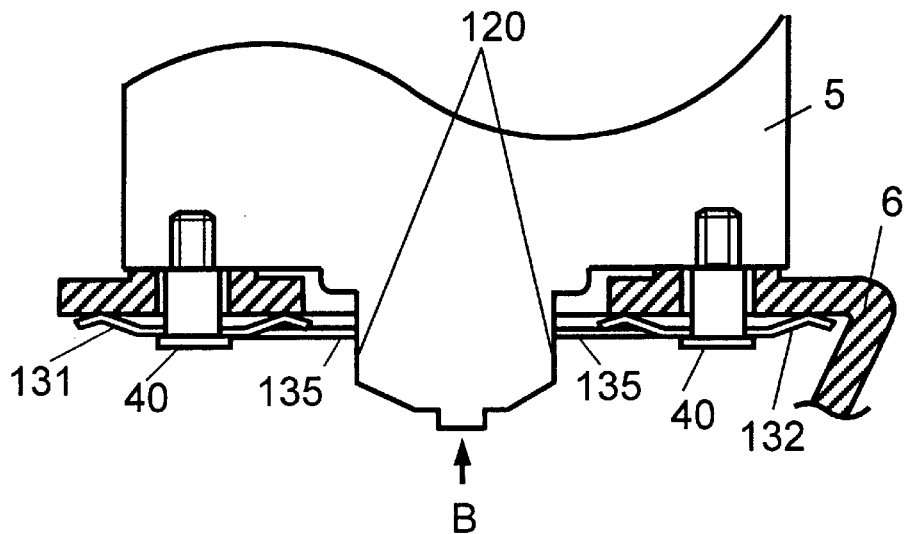
FIG. 12 is a sectional view taken in the direction of Line XII of FIG. 13.

A magnetic recording and reproducing apparatus according to a sixth embodiment is described with reference to FIGS. 12 and 13.

Figure 13:
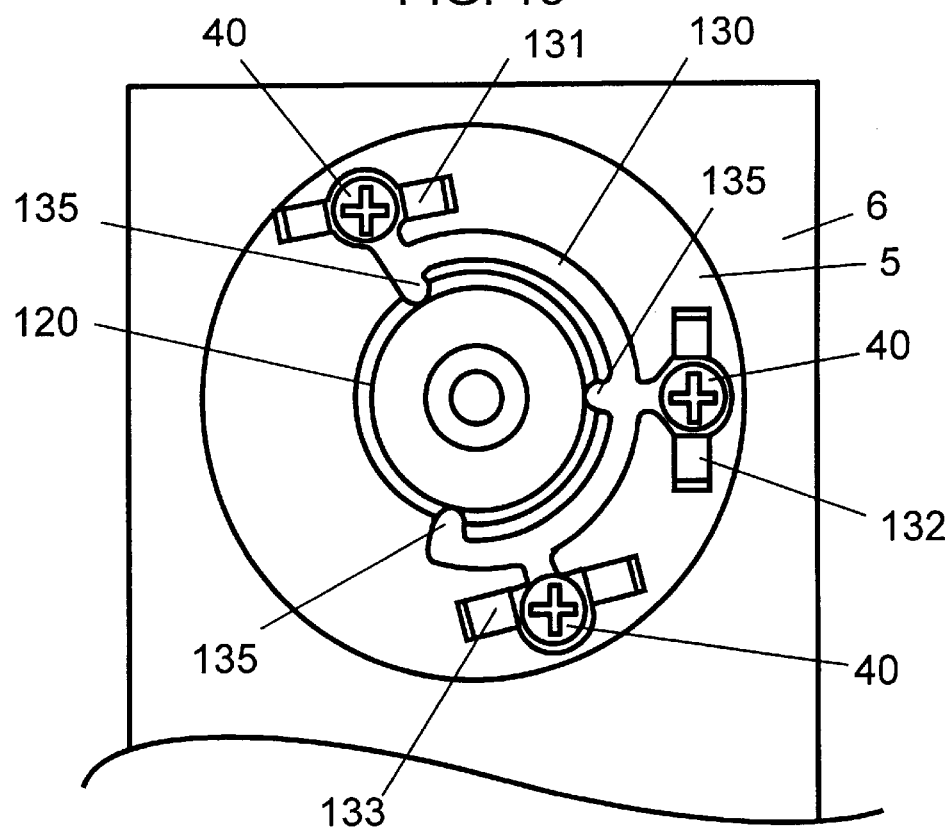
FIG. 13 is a plan view in the direction of arrow B of a cylinder unit fixed onto a chassis of the magnetic recording and reproducing apparatus in accordance with a sixth embodiment of the present invention.

As shown in FIG. 13, an integrated leaf spring 130 is used in the sixth embodiment. The integrated leaf spring 130 is a combined leaf spring made by integrally forming N numbers of leaf springs 131, 132, and 133, and a connecting member made of the same material as the leaf springs.

The cylinder unit 5 is attached to the chassis 6 using set screws 40 and the integrated leaf spring 130 which is a combined leaf spring made by integral formation of leaf springs 131, 132, and 133, i.e., equivalent to N leaf springs. Here, N is a positive whole number. In the sixth embodiment, N is 3. The integrated leaf spring 130 includes N protrusions 135 at a radially inner part. The protrusions 135 are provided on the integrated leaf spring 130 and engage a cylindrical protrusion 120 projecting downward from the cylinder unit 5, thereby facilitating the holding of the cylinder unit 5 in a predetermined position.

In the sixth embodiment, the integration of the leaf spring facilitates assembly of the apparatus, and results in a reduction of the number of components. In addition, the efficiency of assembly of the leaf spring can be improved by fitting in a part of the contour of the combined leaf spring with the protrusion on the cylinder unit.

In the above explanation, the leaf springs at all three attachment points are integrated. It may, however, be acceptable to employ the integrated leaf spring for only 2 of the 3 attachment points, and use an independent leaf spring, as employed in the first to fifth embodiments, for the remaining attachment point. In other words, a number n of leaf springs may be integrally formed, where n is a whole number smaller than the number N, and the remaining number (N−n) of leaf springs may be an independent leaf spring(s). In the sixth embodiment which is illustrated in FIG. 13, n is equal to N.

Seventh Embodiment

Figure 14:
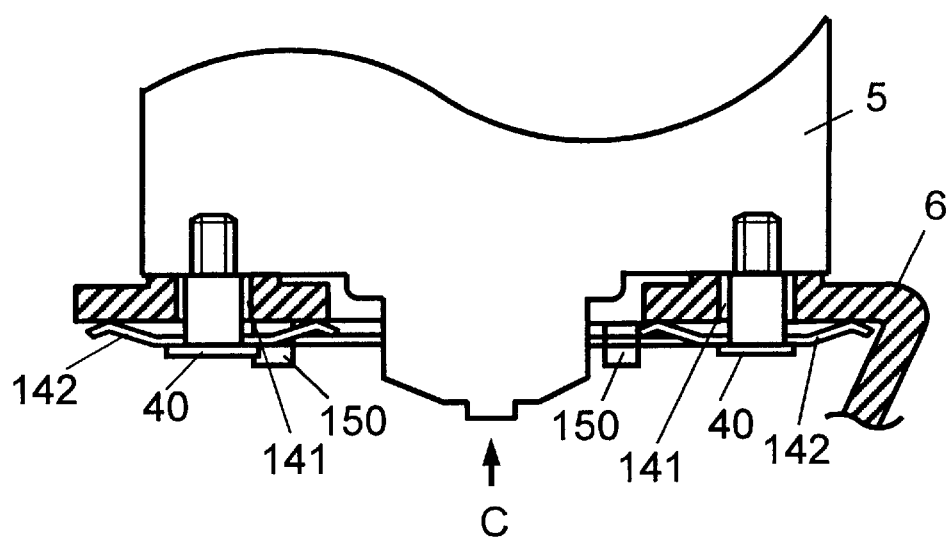
FIG. 14 is a sectional view taken in the direction of Line XIV of FIG. 15.
Figure 15:
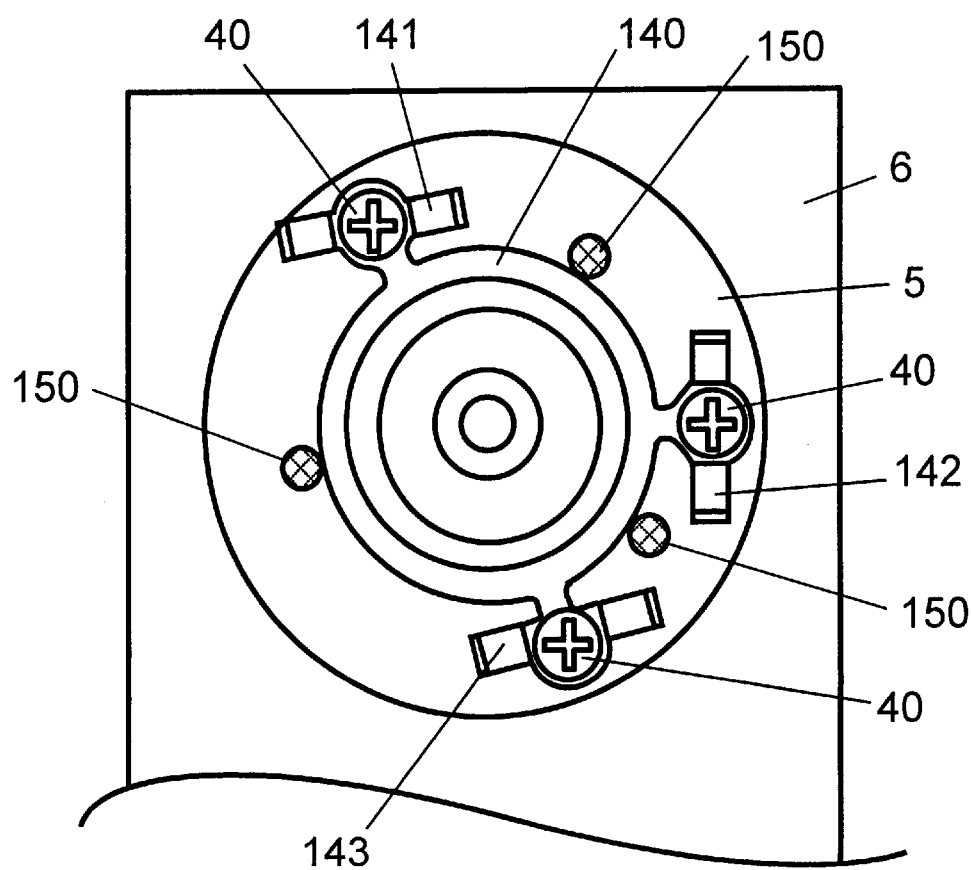
FIG. 15 is a plan view of a cylinder unit fixed onto a chassis of the magnetic recording and reproducing apparatus in accordance with a seventh embodiment of the present invention.

A magnetic recording and reproducing apparatus according to a seventh embodiment is described with reference to FIGS. 14 and 15.

The seventh embodiment also employs an integrated leaf spring 140. However, unlike the sixth embodiment, the integrated leaf spring has no protrusions. As shown in FIG. 15, the integrated leaf spring 140 is a combined leaf spring made by integrally forming a number N of leaf springs 141, 142, and 143.

The cylinder unit 5 is attached to the chassis 6 with three set screws 40 through the leaf springs 141, 142, and 143, respectively. A number of protrusions 150 project from a lower surface of the chassis 6 and engage with the integrated leaf spring 140, such that the chassis 6 is held in a predetermined position. The protrusions 150 are disposed outside of the integrated leaf spring 140. However, the position of the protrusions 150 is not limited. The protrusions 150 may be alternately located inside of the integrated leaf spring 140.

Eighth Embodiment

Figure 16:
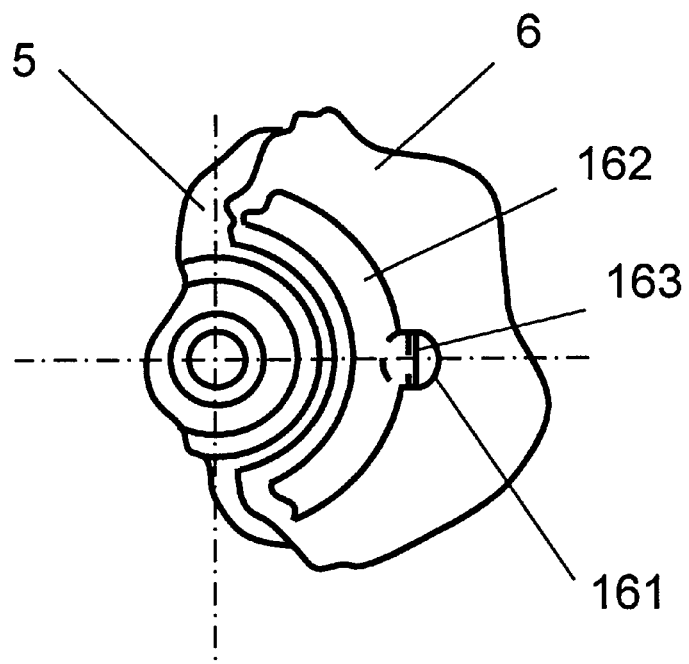
FIG. 16 is a bottom plan view of a magnetic recording and reproducing apparatus in accordance with an eighth embodiment of the present invention for illustrating how an integrated leaf spring is retained at a predetermined position.

A magnetic recording and reproducing apparatus according to an eighth embodiment of the present invention is described with reference to FIGS. 16 and 17.

Figure 17:
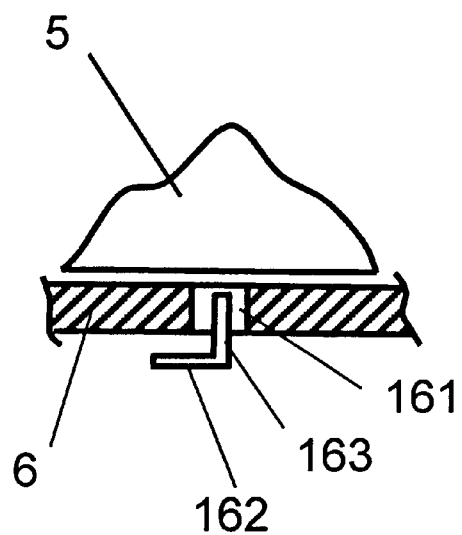
FIG. 17 is a sectional view of a magnetic recording and reproducing apparatus in the eighth embodiment of the present invention for illustrating how the integrated leaf spring is retained at a predetermined position.
Figure 18:
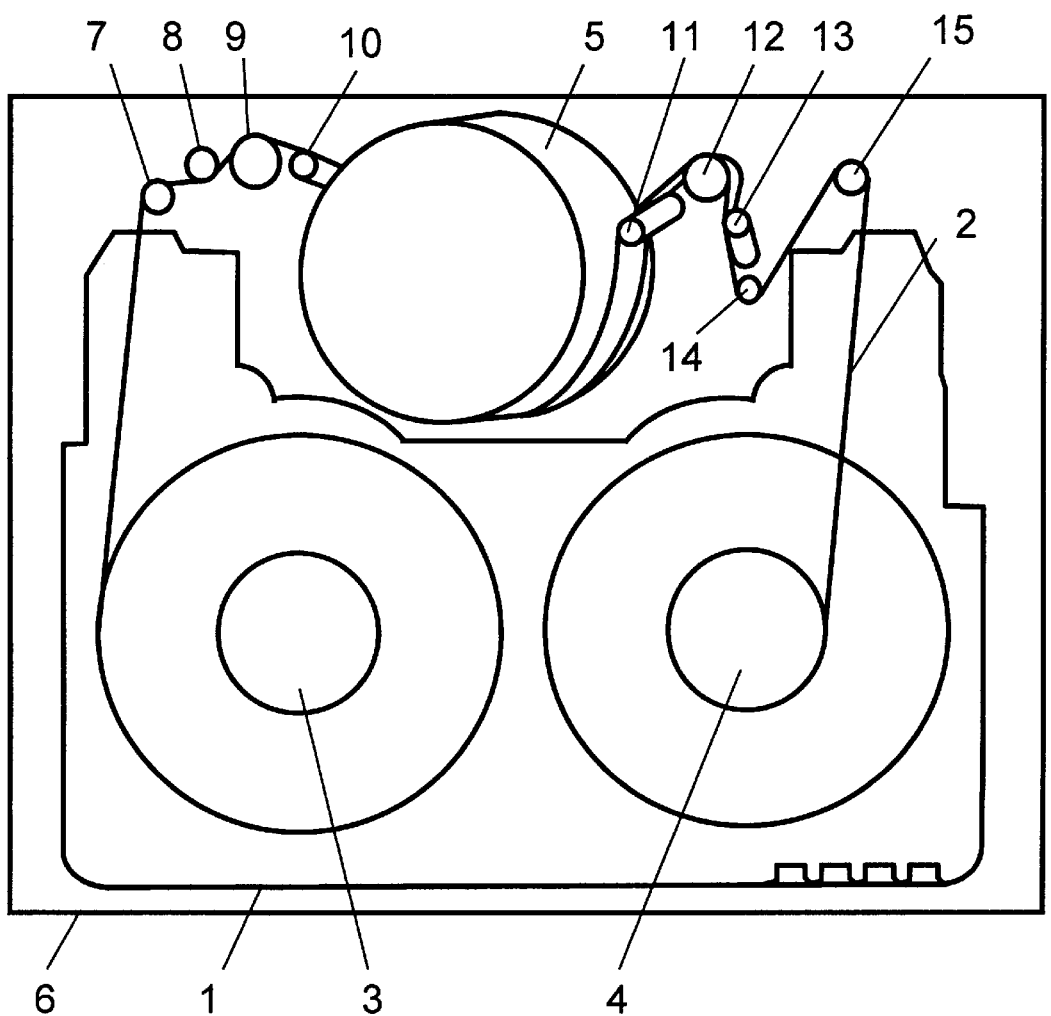
FIG. 18 is a schematic top plan view of a prior art magnetic recording and reproducing apparatus in the position for recording and reproducing signals onto and from a magnetic tape.
Figure 19:
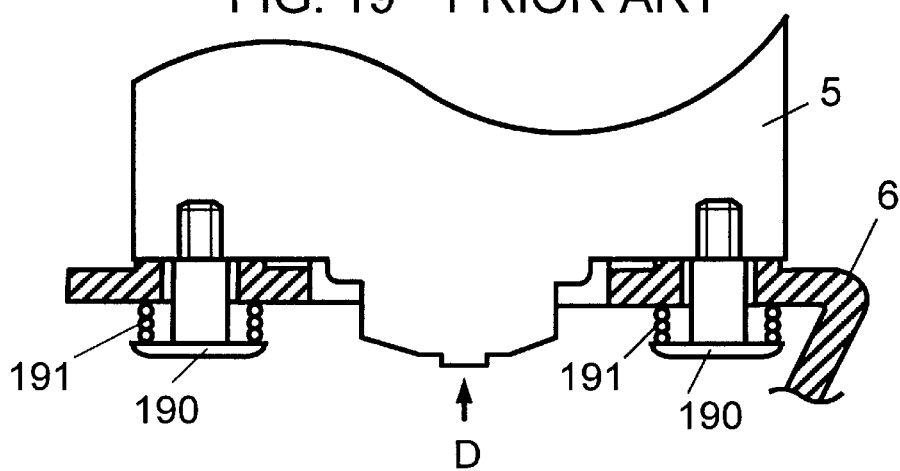
FIG. 19 is a sectional view taken in the direction of along Line XIX of FIG. 20.
Figure 20:
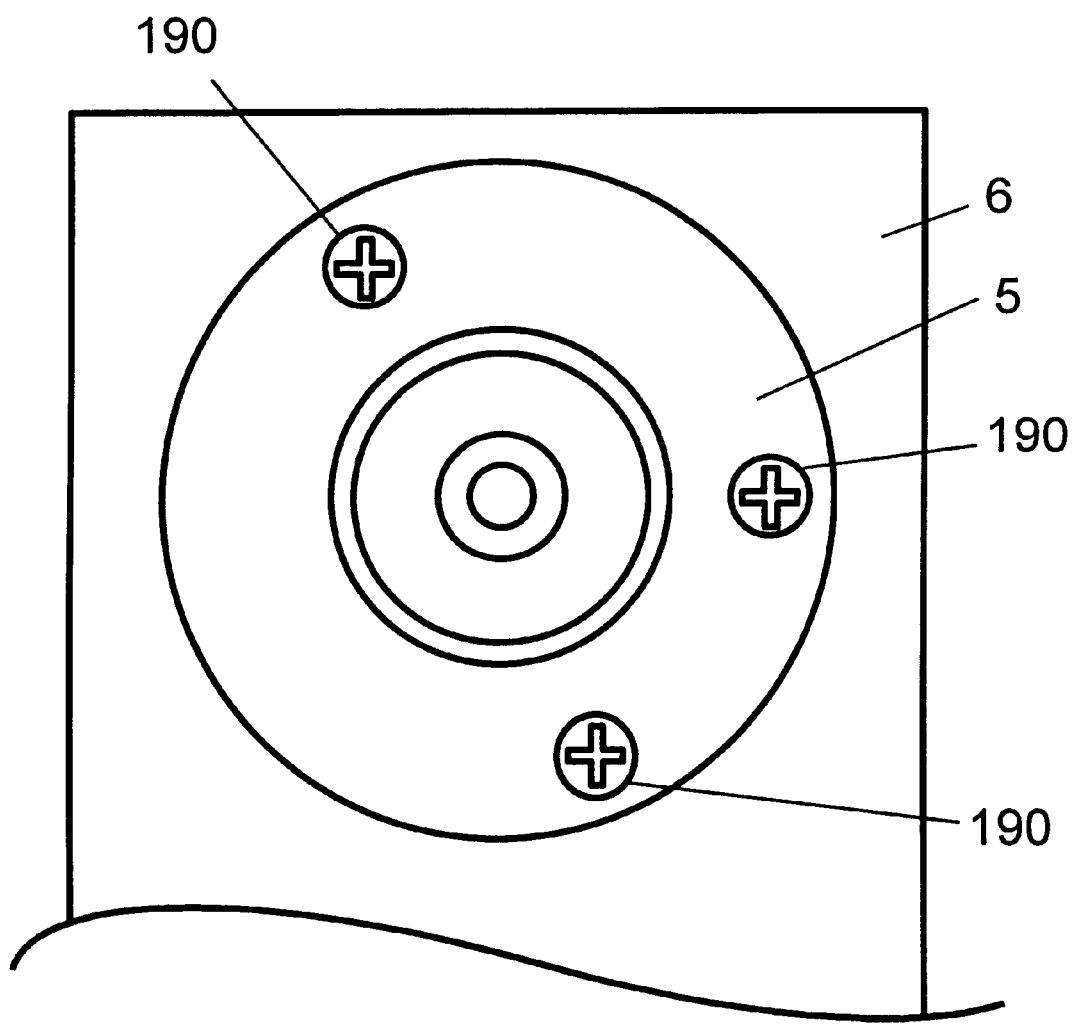
FIG. 20 is a plan view in the direction of arrow D of a cylinder unit fixed onto a chassis of the prior art magnetic recording and reproducing apparatus.

As shown in FIG. 17, a portion of an integrated leaf spring 162 is bent into an approximately perpendicular position relative to the chassis 6. The bent portion 163 is fitted into a hole 161 formed in the chassis 6 in order to attach it to the chassis 6. This arrangement facilitates the holding of the integrated leaf spring 162 in a predetermined position. Thus, it is apparent that the same effects as in other embodiments can be achieved.

In the sixth to eighth embodiments, the cylinder unit can be attached to the chassis without causing distortion of the cylindrical unit 5. Furthermore, integration of the leaf springs improves efficiency in the assembly of the apparatus and results in a reduction of the number of components. Efficiency of assembly of the leaf spring can also be improved by fitting a part of the contour of the combined leaf spring to a part of the chassis or cylinder unit.

As described above, the present invention is related to a magnetic recording and reproducing apparatus which is configured to transport a magnetic tape to the rotary head cylinder unit to which the magnetic head is attached, thereby bringing the magnetic head into contact with the magnetic tape for recording and reproducing signals. A leaf spring is provided between the chassis and set screw to prevent distortion of the cylinder unit. This enables the cylinder unit to be fixed onto the chassis with a constant load while using only a small space, and achieves the outstanding effect of allowing the magnetic recording and reproducing apparatus to be made thinner.

In the above exemplary embodiments, three leaf springs and three set screws are used at three engagement points, and leaf springs are employed at all three engagement points for fixing at a constant load. However, it is apparent that the present invention may be practiced or embodied in still other ways. For instance, one point may be fixed without using a leaf spring, while the other two points are fixed with leaf springs.

What is claimed is:

1. A magnetic recording and reproducing apparatus comprising:
    a chassis having at least one through hole;
    a rotary head cylinder unit supported on said chassis and having at least one threaded recess;
    a fastening member passing through said through hole in said chassis and into said recess in said rotary head cylinder unit, said fastening member having an externally threaded portion which is threadedly engaged in said recess; and
    a leaf spring disposed between an end of said fastening member and said chassis, said leaf spring being configured to apply a predetermined pressing force and including a hole portion through which said fastening member passes, and pressure applying ends provided on opposite sides of the hole portion for pressing against said chassis,
    wherein pressure is applied to said chassis by said leaf spring, and the pressure increases as said fastening member is threaded into said recess and a distance between said rotary head cylinder unit and the hole portion of said leaf spring is maintained at a constant value.

2. The magnetic recording and reproducing apparatus as claimed in claim 1, wherein said fastening member further comprises a retainer, and said leaf spring is disposed between said retainer and said chassis.

3. The magnetic recording and reproducing apparatus as claimed in claim 2, wherein said fastening member further comprises a cylindrical portion which is integrally formed with said externally threaded portion, and said cylindrical portion is concentric with said externally threaded portion.

4. The magnetic recording and reproducing apparatus as claimed in claim 1, further comprising a hollow columnar member defining a through hole, wherein said fasting member passes through said hollow columnar through hole and said leaf spring is integrally connected to one end of said hollow columnar member.

5. The magnetic recording and reproducing apparatus as claimed in claim 1, wherein said fastening member further comprises:
    a columnar portion which is concentric and integrally formed with said externally threaded portion;
    an internally threaded recess formed in an end of said columnar portion; and
    a set screw engaged in said internally threaded recess such that said leaf spring is held between an end face of said columnar portion and a surface of said set screw.

6. The magnetic recording and reproducing apparatus as claimed in claim 1, further comprising a hollow cylindrical spacer defining a through hole, wherein said fastening member extends through said hollow cylindrical spacer and said leaf spring is disposed between said hollow cylindrical spacer and a surface of said fastening member.

7. The magnetic recording and reproducing apparatus as claimed in claim 1, further comprising a leaf spring assembly disposed between an end of said fastening member and said chassis, said leaf spring assembly including a plurality of leaf spring portions and a connecting member formed of a same material as said plurality of leaf spring portions for connecting said plurality of leaf spring portions with each other,
    each of said plurality of leaf spring portions having a hole portion for receiving one of said fastening members therethrough and pressure applying ends provided on opposite sides of said hole portion, for pressing against said chassis,
    said connecting member being disposed at a position that is nearer to a center of said rotary head cylinder unit than said hole portions.

8. A magnetic recording and reproducing apparatus comprising:
    a chassis having a plurality of through holes;
    a rotary head cylinder unit supported on said chassis and having a plurality of threaded recesses;
    a plurality of fastening members passing through said through holes in said chassis and into said recesses in said rotary head cylinder unit, respectively, each of said fastening members having an externally threaded portion which is threadedly engaged in said respective recess; and
    a leaf spring assembly disposed between an end of each of said fastening members and said chassis,
    said leaf spring assembly including a plurality of said leaf spring portions and a connecting member made of the same material as said leaf spring portions for connecting said plurality of leaf spring portions with each other,
    each of said plurality of leaf spring portions having a hole portion through which one of said fastening members passes and pressure applying ends provided on opposite sides of said hole portion for pressing against said chassis, said connecting member being disposed at a location that is nearer to a center of said rotary head cylinder unit than said hole portion through which said fastening member passes, and
    wherein pressure is applied to said chassis by said leaf spring assembly, and the pressure increases as said fastening members are threaded into said recesses.

9. The magnetic recording and reproducing apparatus as claimed in claim 8,
    wherein a portion of said integrated leaf spring is contoured so as to engage with an opposing surface of said rotary head cylinder unit.

10. The magnetic recording and reproducing apparatus as claimed in claim 9, wherein:
    said rotary head cylinder unit comprises a projecting portion which projects through an opening in said chassis; and
    said integrated leaf spring includes a plurality of protrusions engaging an outer peripheral surface of said projecting portion of said rotary head cylinder unit.

11. The magnetic recording and reproducing apparatus as claimed in claim 8, wherein said chassis has a plurality of protrusions which are located closely adjacent an outer periphery of said integrated leaf spring.

12. The magnetic recording and reproducing apparatus as claimed in claim 8, wherein:

said chassis comprises a recess;

said integrated leaf spring includes a protrusion extending perpendicularly relative to said connecting member; and said protrusion is received in said chassis recess.

13. A magnetic recording and reproducing apparatus comprising:

a chassis having at least one through hole;

a rotary head cylinder unit including a rotary head unit on which a rotary head is mounted and a stationary cylinder supported on said chassis, said stationary cylinder having at least one interiorly threaded recess;

a fastening member passing through said through hole in said chassis and into said interiorly threaded recess in said stationary cylinder, said fastening member having a threaded portion, a cylindrical portion concentric to said threaded portion, and a retainer disposed on an end of said cylindrical portion, wherein said threaded portion, said cylindrical portion, and said retainer are formed integrally; and a leaf spring disposed between said chassis and said retainer, said leaf spring having a hole portion through which said fastening member passes and pressure applying ends provided on opposite sides of said hole portion for pressing against said chassis, wherein pressure is applied to said chassis by said leaf spring, and the pressure increases as said fastening member is threaded into said recess and a distance is kept constant between said rotary head cylinder unit and said hole portion.

14. The magnetic recording and reproducing apparatus as claimed in claim 13, further comprising:

a plurality of said fastening members;

a plurality of interiorly threaded recesses formed in said stationary cylindrical member;

a plurality of through holes on said chassis; and a plurality of leaf springs, wherein the number of fastening members equals N, the number of interiorly threaded recesses equals N, the number of through holes equals N, and the number of leaf springs equals N, where N is a positive whole number.

15. The magnetic recording and reproducing apparatus as claimed in claim 14, wherein said N leaf springs are integrally formed with a joining member which is formed of the same material as said leaf springs.

16. The magnetic recording and reproducing apparatus as claimed in claim 15, wherein a portion of said joining member has a contour which engages with one of a peripheral surface of said stationary cylinder and/or a portion of said chassis.

17. A magnetic recording and reproducing apparatus comprising:

a chassis having a plurality of through holes;

a rotary head cylinder unit supported on said chassis and having a plurality of interiorly threaded recesses, wherein each of said interior threaded recesses is aligned with one of said through holes;

a plurality of fastening members passing through said through holes in said chassis and into said interiorly threaded recesses, respectively, each of said plurality of fastening members having an externally threaded portion which is threadedly engaged in said respective interiorly threaded recess; and a plurality of leaf springs disposed between an end of each of said plurality of fastening members and said chassis, respectively, each of said plurality of leaf springs having a hole portion, through which said respective fastening member passes, and pressure applying ends provided on opposite sides of said hole portion for pressing against said chassis, wherein pressure is applied to said chassis by said leaf springs, and, as said fastening members are threaded into said interiorly threaded recesses, the pressure applied to said chassis by said leaf springs is increased, and a constant distance is maintained between said rotary head cylinder unit and said hole portions through which said fastening members of said leaf spring pass.

18. The magnetic recording and reproducing apparatus as claimed in claim 17, wherein each of said fastening members comprises a retainer which engages said respective leaf spring.

19. The magnetic recording and reproducing apparatus as claimed in claim 18, wherein each of said fastening members further comprises a cylindrical portion which is concentric and integral with said externally threaded portion.

20. The magnetic recording and reproducing apparatus as claimed in claim 17, further comprising a plurality of hollow columnar members, wherein said fastening members pass axially through said hollow columnar members, respectively, and said leaf springs are integrally connected to said hollow columnar members, respectively.

* * * * *